US012783192B2

(12) United States Patent
Nakagawa

(10) Patent No.: US 12,783,192 B2
(45) Date of Patent: Nov. 3, 2026

(54) PRINT SERVER AND CONTROL METHOD THEREOF

(71) Applicant: CANON KABUSHIKI KAISHA, Tokyo (JP)

(72) Inventor: Masashi Nakagawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 239 days.

(21) Appl. No.: 18/744,963

(22) Filed: Jun. 17, 2024

(65) Prior Publication Data

US 2024/0427541 A1 Dec. 26, 2024

(30) Foreign Application Priority Data

Jun. 22, 2023 (JP) ................................ 2023-102575

(51) Int. Cl.
*G06F 3/12* (2006.01)

(52) U.S. Cl.
CPC .......... *G06F 3/1262* (2013.01); *G06F 3/1205* (2013.01); *G06F 3/1225* (2013.01)

(58) Field of Classification Search
None
See application file for complete search history.

(56) References Cited

U.S. PATENT DOCUMENTS

2005/0015428 A1 * 1/2005 Ferlitsch ............ H04N 1/00217 709/200
2024/0241682 A1 7/2024 Nakagawa

FOREIGN PATENT DOCUMENTS

JP 2016-033723 A 3/2016

OTHER PUBLICATIONS

Masashi Nakagawa, U.S. Appl. No. 18/744,955, filed Jun. 17, 2024.

* cited by examiner

*Primary Examiner* — Lennin R Rodriguezgonzalez
(74) *Attorney, Agent, or Firm* — VENABLE LLP

(57) ABSTRACT

A print server obtains, from a manager of the print server, designation of a configuration profile that indicates capability of one logical printer associated with a plurality of printing apparatuses, obtains, from the manager, designation of one or more printing apparatuses, among the plurality of printing apparatuses, and presents a plurality of candidates of the configuration profile to the manager. The plurality of candidates includes at least one of a maximum configuration profile that indicates capabilities held by at least one of the printing apparatuses, and a minimum configuration profile that indicates capabilities held by all of the printing apparatuses. The printer server provides an information processing apparatus with a configuration profile designated by the manager, receives a print job to a logical printer from the information processing apparatus, and transmits the print job to one of the printing apparatuses.

8 Claims, 16 Drawing Sheets

FIG. 7A

700

| CAPABILITY (701) | DEVICE A (702) | DEVICE B (703) | DEVICE C (704) | DEVICE D (705) |
|---|---|---|---|---|
| STAPLER | N | Y | Y | Y |
| NEEDLE-LESS STAPLING | N | N | Y | N |
| PUNCH | N | N | N | Y |
| BOOKBINDING | N | N | N | Y |
| EXTENSION CASSETTE 1 | Y | Y | Y | Y |
| EXTENSION CASSETTE 2 | N | N | Y | Y |

FIG. 7B

710

| CAPABILITY (711) | DEVICE A (712) | DEVICE B (713) | DEVICE C (714) | MAXIMUM CONFIGURATION (715) | MINIMUM CONFIGURATION (716) |
|---|---|---|---|---|---|
| STAPLER | N | Y | Y | Y | N |
| NEEDLE-LESS STAPLING | N | N | Y | Y | N |
| PUNCH | N | N | N | Y | N |
| BOOKBINDING | N | N | N | N | N |
| EXTENSION CASSETTE 1 | Y | Y | Y | Y | Y |
| EXTENSION CASSETTE 2 | N | N | Y | Y | N |

PRINT SERVER AND CONTROL METHOD THEREOF

BACKGROUND OF THE INVENTION

Field of the Invention

The present invention relates to a print server and a control method thereof.

Description of the Related Art

In recent years, a cloud printing service in which a print job is submitted to a printing apparatus via cloud is becoming widespread. The cloud printing service provides a logical printer to a user. The user submits a print job to the logical printer. The print job submitted to the logical printer is processed by a physical printer associated with the logical printer. The capability of a logical printer is indicated by a configuration profile. In Japanese Patent Laid-Open No. 2016-33723, a technique is described in which a general printer driver in common between models is used as a printer driver specific to each model by associating a configuration profile of the model to the printer driver. There are cases where a plurality of physical printers are associated with one logical printer. When the printer driver generates a print job to the logical printer, it may not be determined which of the plurality of physical printers will execute printing. When the physical printers respectively have capabilities different to each other, it has been difficult to provide an appropriate configuration profile that indicates the capability of the logical printer.

SUMMARY OF THE INVENTION

One aspect of the present invention provides a technique for providing an appropriate configuration profile to a user. According to some embodiments, a print server comprises an obtaining unit configured to obtain, from a manager of the print server, designation of a configuration profile that indicates a capability of one logical printer associated with a plurality of printing apparatuses; a providing unit configured to provide an information processing apparatus with a configuration profile designated by the manager; a receiving unit configured to receive a print job to the logical printer from the information processing apparatus; and a transmitting unit configured to transmit the print job to one of the plurality of printing apparatuses is provided.

Further features of the present invention will become apparent from the following description of exemplary embodiments with reference to the attached drawings.

BRIEF DESCRIPTION OF THE DRAWINGS

FIGS. 7A and 7B are diagrams for describing a configuration profile of some embodiments.

DESCRIPTION OF THE EMBODIMENTS

Figure 1:
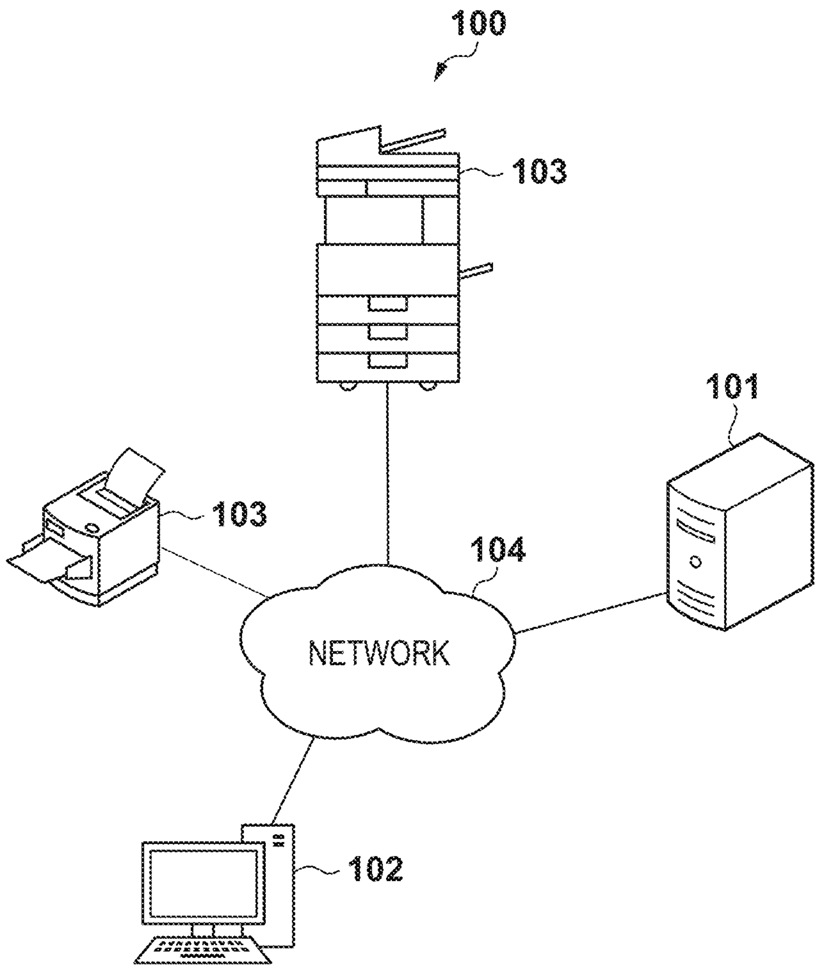
FIG. 1 is a block diagram for describing an exemplary configuration of a print system of some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

[Exemplary Configuration of Print System]

An exemplary configuration of a print system 100 according to some embodiments will be described with reference to FIG. 1. The print system 100 includes a print server 101, an information processing apparatus 102, and printing apparatuses 103, for example. The number of each constituent element of the print system 100 is not limited to the example in FIG. 1. For example, two printing apparatuses 103 are shown in FIG. 1, but the print system 100 may also include three or more printing apparatuses 103. Also, the print system 100 may include a constituent element that is not shown in FIG. 1.

Each constituent element of the print system 100 is connected to a network 104. The print server 101 may be able to communicate with the information processing apparatus 102 and the printing apparatuses 103 through the network 104. The network 104 may be a local area network (LAN), a wide area network (e.g., the Internet), or a cellular network, or any combination of these, and may also be the Internet, for example. The network 104 may include a wireless segment, and may also include a wired segment.

The print server 101 provides a printing service in which print jobs are transmitted to the printing apparatuses 103, according to the print jobs generated by the information processing apparatus 102. For example, the print server 101 provides a logical printer to the information processing apparatus 102, and accepts a print job to the logical printer. The logical printer is a virtual printing apparatus (e.g., printer object) provided by the print server 101. The logical printer may also be referred to as a cloud printer. In contrast to the logical printer, a physical printing apparatus such as the printing apparatuses 103 may be referred to as a physical printer. The printing apparatus 103 is registered to the print server 101 by a tenant manager, for example, and is associated with a logical printer. Only one physical printer may be associated with one logical printer, or a plurality of physical printers may also be associated with one logical printer.

The print server 101 may be a server in an on-premise environment that is connected to the network 104, or may also be a server in a cloud computing environment (hereinafter, simply referred to as cloud). The printing service provided by the print server 101 in the cloud may also referred to as a cloud printing service (hereinafter, referred to as CPS). UniFLOW Online is an example of the cloud printing service. A case where the print server 101 is in the cloud will be described below. However, the following description similarly applies to a case where the print server 101 is in an on-premise environment. In the following description, a person who manages a print service provided by the print server 101 is referred to as a manager of the print server 101. The management of the print service may include changing of the setting regarding the print service, for example. A person who uses the print service provided by the print server 101 is referred to as a user of the print server 101. The user of the print server 101 may be able to execute some of the management of the print service, as a manager of the print server 101.

The information processing apparatus 102 provides a printing function to a user of the information processing apparatus 102. The information processing apparatus 102 may be a personal computer (PC), a smartphone, or another device. The information processing apparatus 102 may designate a physical printer connected to the same LAN as an output destination, or may also designate a logical printer provided by the print server 101 as an output destination. When a logical printer is designated as the output destination, a physical printer associated with the logical printer (printing apparatus 103) performs printing (e.g., performs paper discharging). The information processing apparatus 102 that uses the CPS may also be referred to as a client or a client terminal. Printing performed by a print job being submitted to a logical printer may be referred to as cloud printing or remote printing.

The printing apparatus 103 has a printing function of performing printing according to a print job. Printing may be printing on a sheet-like recording medium such as paper, or may also be three-dimensional object forming (so-called three-dimensional printing). The printing method may be electrographic printing, ink jet printing, thermal ink-transfer printing, or another method. The printing apparatus 103 may also be referred to as an image forming apparatus. The printing apparatus 103 may further include at least one of a scanner function and a fax function, as main functions. The printing apparatus having a plurality of main functions may be referred to as a multifunction peripheral (MFP). Instead thereof, the printing apparatus 103 may be a single function printer (SFP) that has only a printing function as a main function. In the following description, the printing apparatus 103 may be referred to as a device.

The printing apparatus 103 may further have a login function. The login function may be a function of causing a user to login to the printing apparatus. The printing apparatus 103 having the login function may authenticate a user, and provide processing according to an authenticated user. For example, the printing apparatus 103 may request a user to input a user name and a password. Instead of this or in addition to this, the printing apparatus 103 may read out authentication information of a user from an integrated circuit (IC) card that the user has.

The printing apparatus 103 supports storing printing. The storing printing may be a printing method in which a print job transmitted from the information processing apparatus 102 to the print server 101 is retained in the print server 101 in a holding state, and the printing apparatus 103 starts printing in response to an additional instruction from a user. In order to not allow a user to start printing of a print job submitted by another user, the printing apparatus 103 may release a holding state of a print job related to a user on the condition that the user has logged in to the printing apparatus 103.

When a plurality of physical printers are associated with one logical printer, a user need not designate a physical printer that executes printing at a point in time at which the user submits a print job to the logical printer. In this case, the user may instruct, after submitting a print job to the logical printer, the print server 101 to release the holding state of the print job by operating any of the plurality of physical printers. The print server 101 transmits the print job to the physical printer that has transmitted this instruction. Thereafter, the printing apparatus 103 executes printing according to the received print job. In the following description, for the sake of simplicity, the number of logical printers that one user can use is assumed to be one. When one user can use a plurality of logical printers, the following description may also apply to each of the plurality of logical printers.

[Exemplary Hardware Configuration of Computer]

Figure 2:
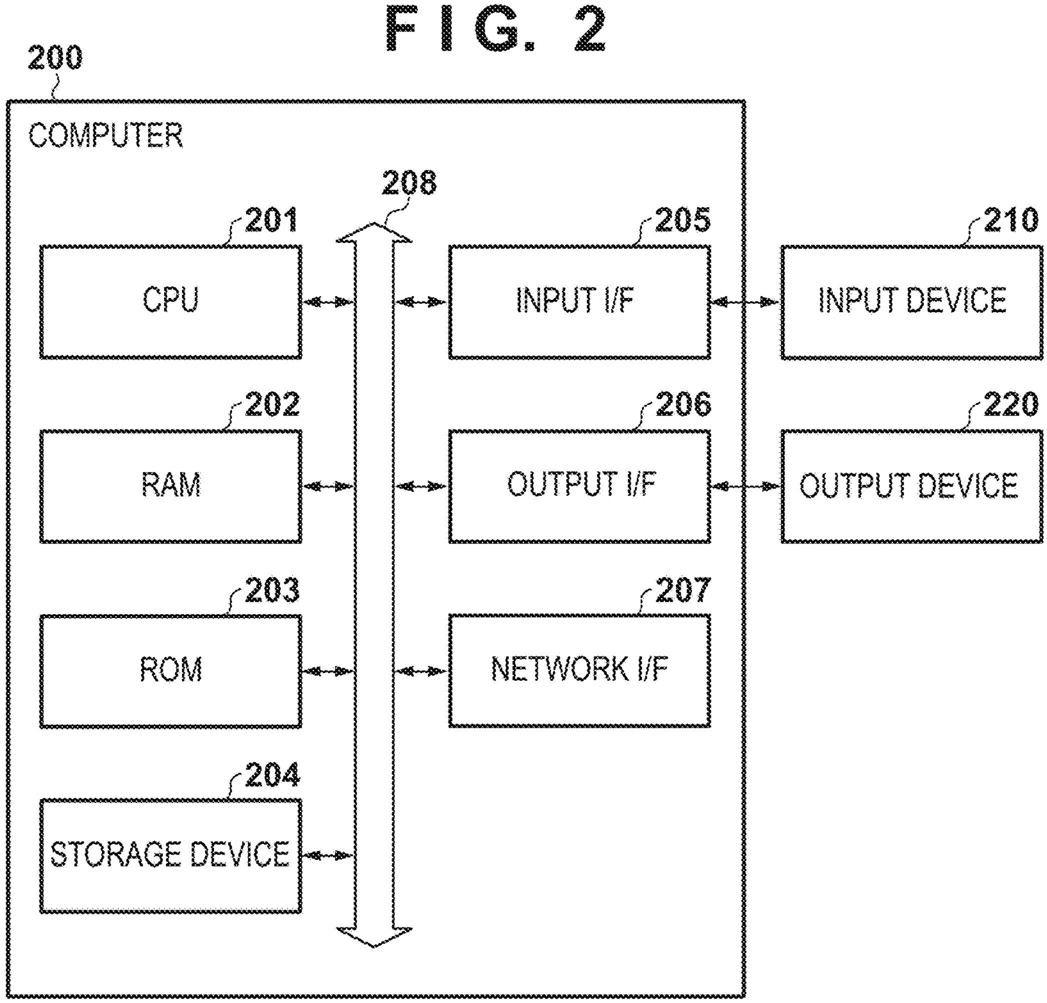
FIG. 2 is a block diagram for describing an exemplary hardware configuration of a computer of some embodiments.

An exemplary hardware configuration of a computer 200 according to some embodiments will be described with reference to FIG. 2. The computer 200 may be used as the print server 101, or may also be used as the information processing apparatus 102. The computer 200 may include constituent elements shown in FIG. 2.

A central processing unit (CPU) 201 is a general-purpose processing circuit that controls overall operations of the computer 200. A random access memory (RAM) 202 is a volatile memory circuit, and is used as a temporary storage such as a work area for the processing performed by the CPU 201. A read only memory (ROM) 203 is a nonvolatile memory circuit, and stores a program (e.g. basic input output system (BIOS)) and data that are processed by the CPU 201. A storage device 204 is a nonvolatile storage device, and stores a program and data to be processed by the CPU 201. The storage device 204 may be a hard disk drive (HDD) or a solid-state drive (SSD), for example. The storage device 204 may also be referred to as a secondary storage device. The operations performed by the computer 200 may be realized by a program read out from the storage device 204 to the RAM 202 being executed by the CPU 201.

An input interface (I/F) 205 is an I/F for exchanging signals with an input device 210. The input device 210 is a device for obtaining an input from a user of the computer 200. The input device 210 may be a keyboard, a touch panel, a microphone, or a mouse, or any combination of these, for example. An output I/F 206 is an I/F for exchanging signals with an output device 220. The output device 220 is a device for providing information to a user of the computer 200. The output device 220 may be a display or a speaker, or any combination of these, for example. A network I/F 207 is an I/F for communicating with a device outside of the computer 200. The CPU 201, RAM 202, ROM 203, storage device 204, input I/F 205, output I/F 206, and network I/F 207 are connected to a system bus 208. In the example in FIG. 2, the input device 210 and output device 220 are shown as devices separate from the computer 200. Instead thereof, the computer 200 may include the input device 210 and output device 220.

[Exemplary Software Configuration of Information Processing Apparatus]

Figure 3:
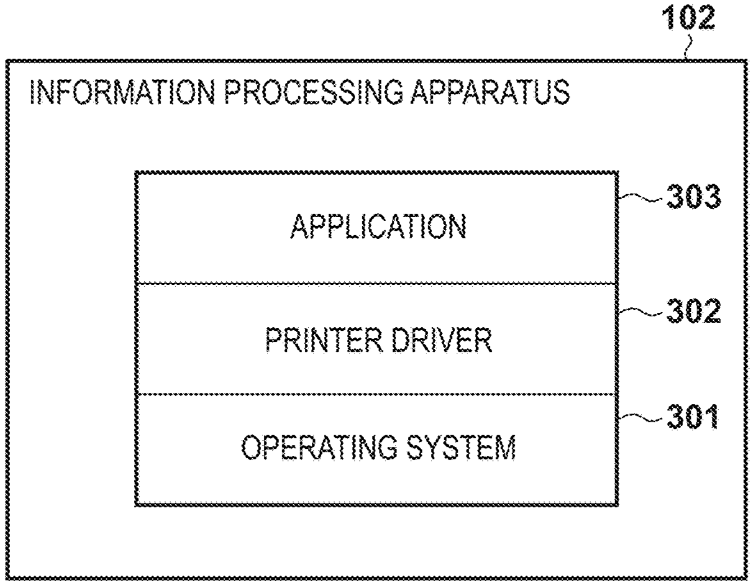
FIG. 3 is a block diagram for describing an exemplary software configuration of an information processing apparatus of some embodiments.

An exemplary software configuration of the information processing apparatus 102 according to some embodiments will be described with reference to FIG. 3. An operating system (OS) 301, a printer driver 302, and an application 303 are installed on the information processing apparatus 102. The OS 301, printer driver 302, and application 303 may be stored in the storage device 204 of the information processing apparatus 102. At the time of execution, these programs may be read out to the RAM 202 of the information processing apparatus 102, and be executed by the CPU 201 of the information processing apparatus 102.

The OS 301 is software for providing basic operations of the information processing apparatus 102 to a user. The printer driver 302 is software for providing operations related to printing to the user. The printer driver 302 may be able to execute an operation of generating a print job to a logical printer provided by the print server 101. The printer driver for providing, to the user, an operation related to printing using a logical printer provided by the CPS, as described above, may be referred to as a cloud printer driver. An application 303 is software for providing a specific operation to the user. Upon receiving a print instruction from the user, the application 303 may call the printer driver 302 for processing the print instruction.

[Exemplary Functional Configuration of Print Server]

Figure 4:
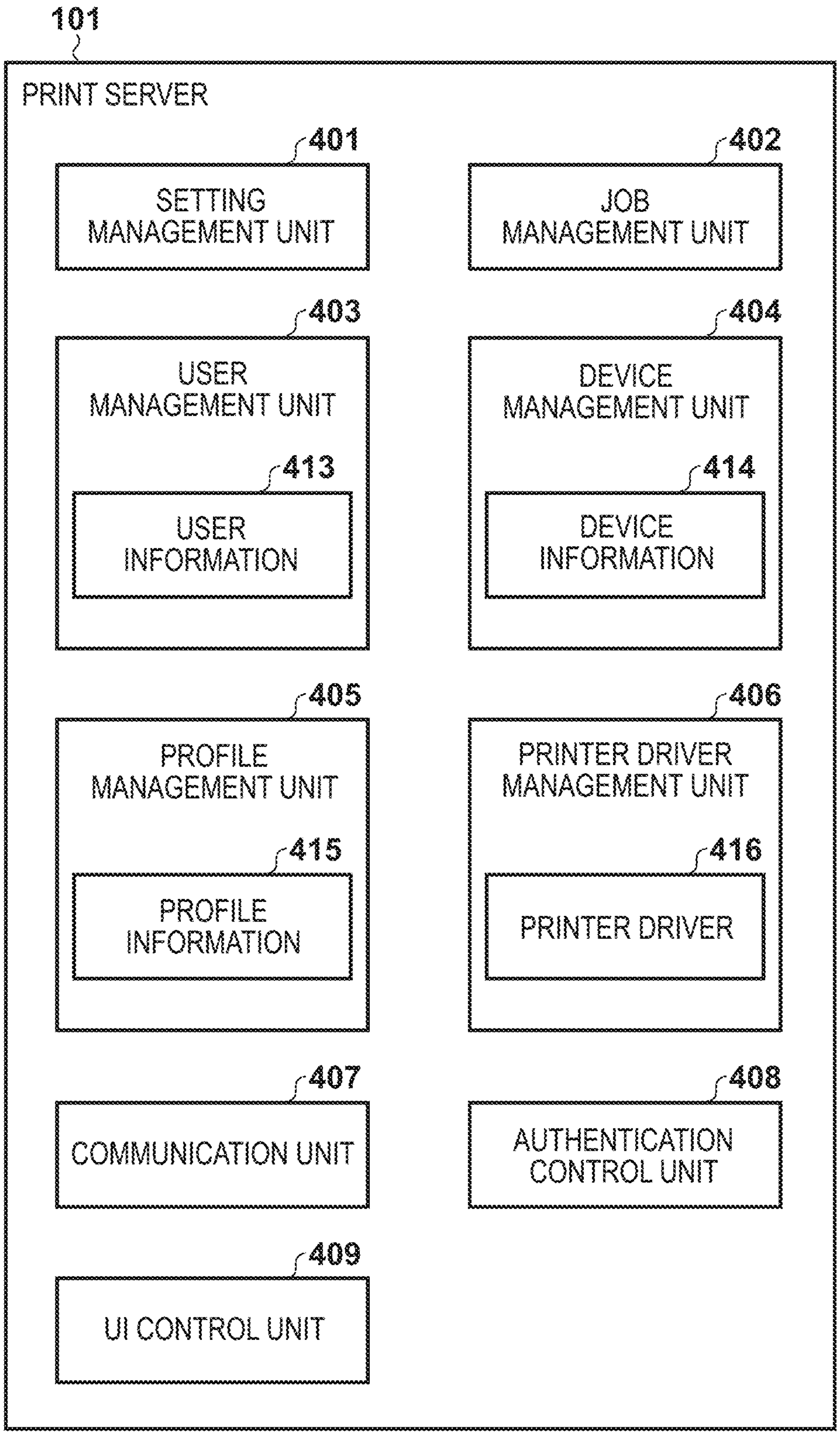
FIG. 4 is a block diagram for describing an exemplary functional configuration of a print server of some embodiments.
Figure 5:
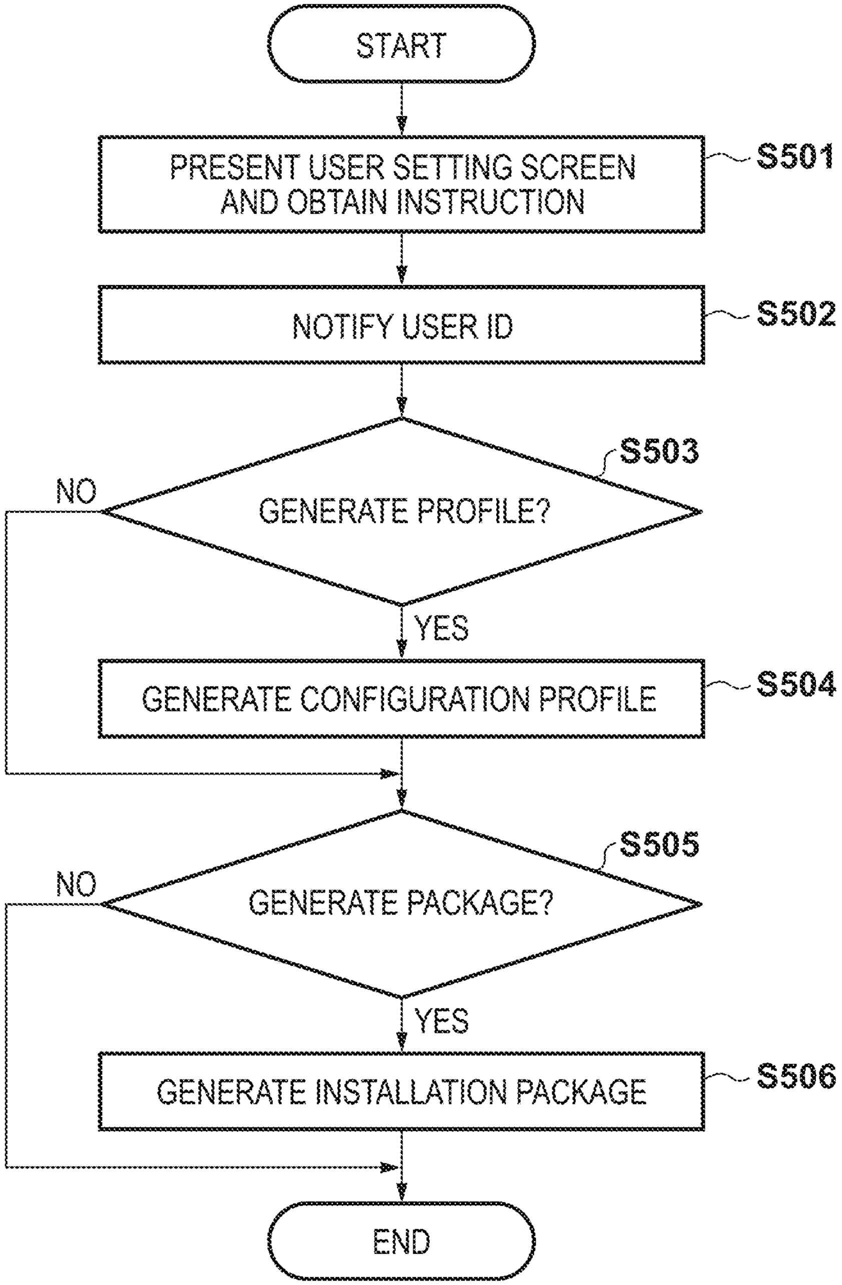
FIG. 5 is a flow diagram for describing an exemplary operation of user registration processing of some embodiments.

An exemplary functional configuration of the print server 101 according to some embodiments will be described with reference to FIG. 4. The print server 101 may include functional blocks shown in FIG. 4. Instead thereof, the print server 101 may include a functional block that is not shown in FIG. 4, or may not include at least some of the functional blocks shown in FIG. 4. Each functional block of the print server 101 may be realized by a program read out to the RAM 202 of the print server 101 being executed by the CPU 201 of the print server 101. Instead thereof, some of or all of the functions of the print server 101 may also be realized by a dedicated integrated circuit such as an application specific integrated circuit (ASIC).

A setting management unit 401 manages settings related to the CPS. For example, the setting management unit 401 stores the settings related to the CPS in a storage of the print server 101 (e.g., RAM 202, storage device 204, or the like; the same applies hereinafter), updates settings, and reads out settings from the storage.

A job management unit 402 manages print jobs to be used in the CPS. For example, the job management unit 402 stores a print job received from the information processing apparatus 102 in the storage of the print server 101. The job management unit 402 reads out a print job requested by the printing apparatus 103 from the storage, and transmits this print job to the printing apparatus 103.

A user management unit 403 manages users that use the CPS. For example, the user management unit 403 stores information regarding a user that uses the CPS in the storage of the print server 101 as user information 413. The user management unit 403 reads out, updates, or deletes a portion of the user information 413, as needed. For example, the user management unit 403 may register a new user. The user information 413 may include an identifier, authentication information, a usable device, a belonging group, and the like with respect to each of a plurality of users to be managed, for example.

A device management unit 404 manages devices (e.g., printing apparatus 103) that can be used in the CPS. For example, the device management unit 404 stores information regarding a device that can be used in the CPS in the storage of the print server 101, as device information 414. The device management unit 404 reads out, updates, or deletes a portion of the device information 414, as needed. For example, the device management unit 404 may register a new device. The device information 414 may include an identifier, a capability, a state, an internet protocol (IP) address, and the like with respect to each of a plurality of devices to be managed. The printing apparatus 103 may be registered by a manager, or may be registered in response to a request from the printing apparatus 103.

The capability of the printing apparatus 103 may be functions that can be used in the printing apparatus 103, or items that can be set with the functions. The functions that can be used in the printing apparatus 103 may include an option function that can be additionally extended in the printing apparatus 103. For example, when the printing apparatus 103 includes a double-sided printing unit, and the printing apparatus 103 can execute double-sided printing using the double-sided printing unit, the printing apparatus 103 has a capability of double-sided printing. The functions that can be used in the printing apparatus 103 may also be a function supported by the printing apparatus 103 or a function that is enabled in the printing apparatus 103. For example, when the printing apparatus 103 has a double-sided printing unit, but the usage of the double-sided printing unit is set to be disabled, the printing apparatus 103 may be regarded as not having a capability of double-sided printing. The capabilities of the printing apparatus 103 may be color printing, monochrome printing, bookbinding, stapling, outputable paper size, outputable paper type, and the like in addition to double-sided printing. The capability of the printing apparatus 103 may differ depending on the model of the printing apparatus. Also, the capability may differ depending on whether an optional configuration is included, even when the model of the printing apparatus is the same.

A profile management unit 405 manages configuration profiles of logical printers provided through the CPS by the print server 101. For example, the profile management unit 405 stores information regarding a configuration profile of a logical printer in the storage of the print server 101 as profile information 415. The profile management unit 405 reads out, updates, or deletes a portion of the profile information 415, as needed.

The configuration profile of a logical printer is information indicating the capability of the logical printer provided by the print server 101. For example, the configuration profile may indicate that the logical printer has capabilities of color printing and double-sided printing, and does not have a capability of bookbinding. When the print server 101 provides a plurality of logical printers, the profile management unit 405 manages the configuration profile for each logical printer. In some embodiments, the profile management unit 405 may manage, with respect to one logical printer, a configuration profile specific to each user. For example, the profile management unit 405 may manage, with respect to one logical printer, a configuration profile associated with a user A and a configuration profile associated with a user B.

In some embodiments, the profile management unit 405 may manage, with respect to one logical printer, a specific configuration profile for each location of the information processing apparatus 102. For example, the profile management unit 405 may manage, with respect to one logical printer and one user, a configuration profile associated with a location A (e.g., workplace) and a configuration profile associated with a location B (e.g., one's home).

A configuration profile is provided to the information processing apparatus 102. The information processing apparatus 102 recognizes that the logical printer has a capability indicated by the configuration profile, and can accept from a user an instruction for printing in which this capability is used.

A printer driver management unit 406 manages a printer driver configured to generate a print job to the logical printer provided by the print server 101. For example, the printer driver management unit 406 stores a printer driver 416 in the storage of the print server 101. The printer driver management unit 406 reads out, updates, or deletes the printer driver 416, as needed.

When the print server 101 provides a plurality of logical printers, the printer driver management unit 406 manages the printer driver 416 for each logical printer. The printer driver management unit 406 may generate an installation package for installing the printer driver 416 in the information processing apparatus 102. The installation package may be referred to as an installer. The printer driver management unit 406 includes the printer driver 416 in the installation package. The printer driver management unit 406 may include a configuration profile in the installation package. The configuration profile included in the installation package may be a configuration profile associated with a specific user, or may also be a generalized (e.g., default) configuration profile that does not depend on a specific user.

A communication unit 407 performs communication with other apparatuses such as the information processing apparatus 102 and the printing apparatus 103, for example. An authentication control unit 408 controls authentication of a user and authentication of the printing apparatus 103. A user interface (UI) control unit 409 generates a screen for setting a user and the printing apparatus 103 that are to be registered to the CPS, and operating the saved print jobs, and presents the screen to a manager and a user of the print server 101.

[Exemplary Operation of User Registration Processing]

An exemplary operation of the processing for the print server 101 to register a user to the CPS (that is, user registration processing)) will be described with reference to FIGS. 5 to 10. The steps of the method in FIG. 5 may be performed by the CPU 201 of the print server executing a program read out in the RAM 202 of the print server 101. Instead thereof, a portion or the entirety of the steps of the method in FIG. 5 may be performed by a dedicated circuit such as an ASIC. The same applies to other methods described below to be executed by the print server 101. The method in FIG. 5 may be started in response to receiving an instruction to start user registration processing from a manager of the print server 101. The manager of the print server 101 may be a user having an administrator right.

In step S501, the print server 101 (e.g., UI control unit 409) generates a screen (hereinafter referred to as a user setting screen) for setting user information, and presents the user setting screen to the manager. When the manager uses the print server 101 locally, the print server 101 may display the user setting screen in the output device 220 (e.g., display device). When the manager remotely accesses the print server 101 using an external apparatus (e.g., information processing apparatus 102), the print server 101 may transmit the user setting screen to the external apparatus for display therein. The same applies to other screens described below. The print server 101 (e.g., UI control unit 409) obtains information regarding a user from the manager through the user setting screen.

Figure 6:
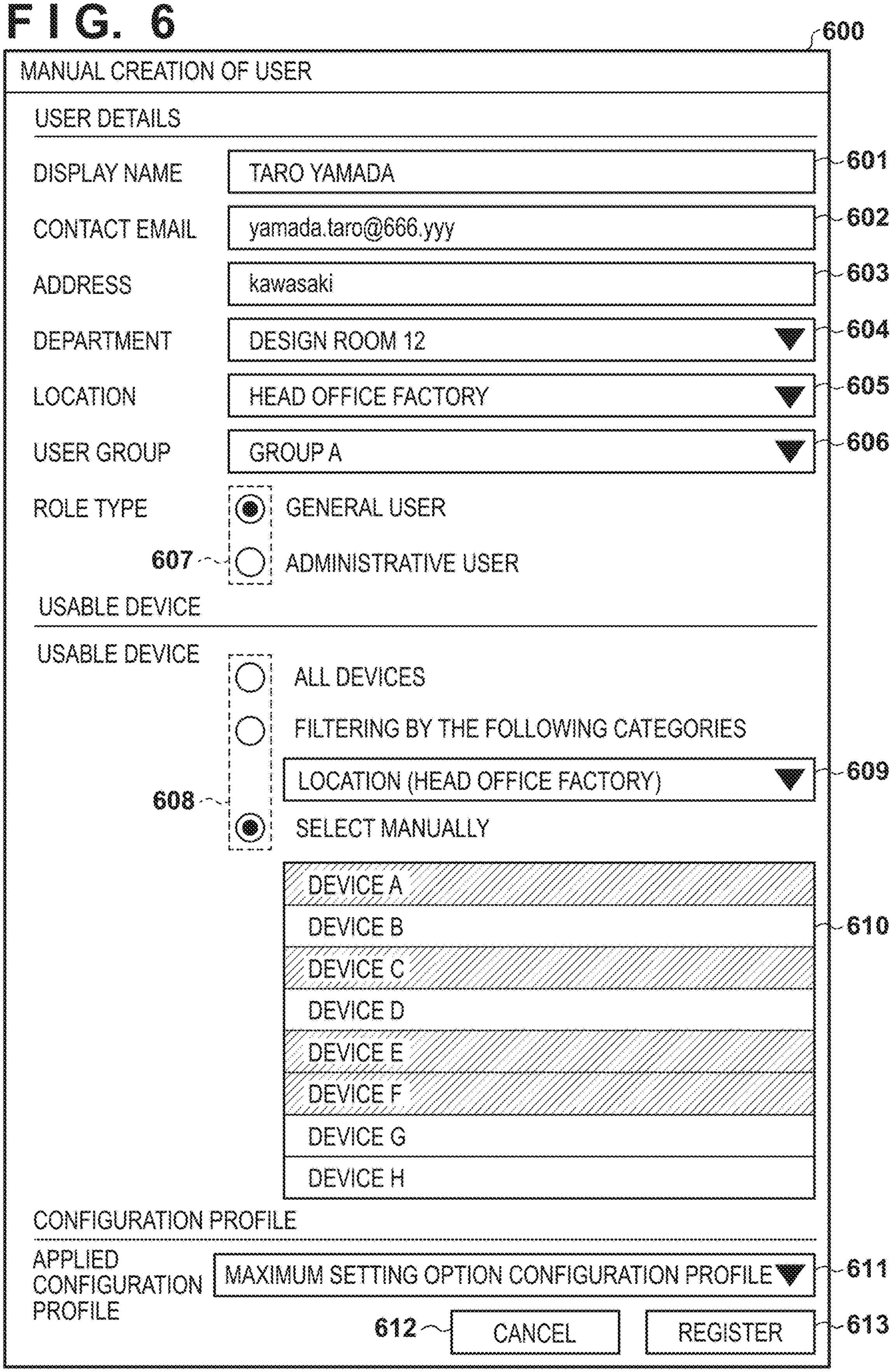
FIG. 6 is a schematic diagram for describing an example of a user setting screen of some embodiments.

An example of a user setting screen 600 will be described with reference to FIG. 6. A manager of the print server 101 can execute, through the user setting screen 600, inputting detailed information regarding a user, designation of a device (printing apparatus 103) that is to be available to the user, and designation of a configuration profile to be associated with the user. For example, the user setting screen 600 may include a field 601 for inputting a user display name, a field 602 for inputting a user mail address, and a field 603 for inputting an address of the user. Also, the user setting screen 600 may further include a pulldown list 604 for designating a department to which the user belongs, a pulldown list 605 for designating a user location, and a pulldown list 606 for designating a user group to which the user belongs. Moreover, the user setting screen 600 may also include a radio button 607 for designating a role type (general user or administrator user) of the user.

The user setting screen 600 may also include a radio button 608 for designating at least one printing apparatus 103, out of a plurality of printing apparatuses 103 associated with the logical printer to be provided to the user, that is to be available to the user. If "all devices" is designated by the radio button 608, the print server 101 makes all of the plurality of printing apparatuses 103 associated with the logical printer to be provided to the user available to the user. If "filtering by the following category" is designated by the radio button 608, the print server 101 makes at least one printing apparatus 103 obtained by filtering by the category designated on the pulldown list 609 available to the user. The options presented on the pulldown list 609 may include a department set on the pulldown list 604, a location set on the pulldown list 605, or a user group set on the pulldown list 606, for example. If "manually select" is designated by the radio button 608, the print server 101 makes one or more printing apparatuses 103 selected by the manager from the list 610 available to the user. The list 610 shows a plurality of printing apparatuses 103 associated with a logical printer to be provided to a user.

The user setting screen 600 may also include a pulldown list 611 for designating a configuration profile to be associated with the user. The options presented by the pulldown list 611 may include "none", "maximum setting option configuration profile", "minimum setting option configuration profile", and "create configuration profile". In the following description, the maximum setting option configuration profile and minimum setting option configuration profile are respectively denoted as a maximum configuration profile and a minimum configuration profile. The options presented by the pulldown list 611 may also include a configuration profile associated with a user group to which the user belongs. As described above, the pulldown list 611 presents a plurality of candidates of the configuration profile.

When "none" is designated on the pulldown list 611, the print server 101 will not associate a configuration profile with the user. In this case, the user does not have a configuration profile specific to the user. When "maximum setting option configuration profile" is designated on the pulldown list 611, the print server 101 associates a maximum configuration profile with the user. The maximum configuration profile may be a configuration profile indicating capabilities that at least one of the one or more printing apparatuses 103 that are designated by the manager as being available to the user has. When "minimum setting option configuration profile" is designated on the pulldown list 611, the print server 101 associates a minimum configuration profile with the user. The minimum configuration profile may be a configuration profile indicating capabilities that all of the one or more printing apparatuses 103 that are designated by the manager as being available to the user have. When "create configuration profile" is designated on the pulldown list 611, the print server 101 executes processing for creating a configuration profile. This processing will be described later.

An example of the maximum configuration profile and minimum configuration profile will be described with reference FIGS. 7A and 7B. A table 700 in FIG. 7A shows capabilities of a plurality of printing apparatuses 103 associated with one logical printer. In this example, four printing apparatuses 103, namely devices A to D, are associated with one logical printer. A column 701 shows types of capabilities of the printing apparatuses 103. A column 702 shows whether the device A has respective capabilities. In the column 702, "Y" indicates that the device A has a specific capability, and "N" indicates that the device A does not have a specific capability. The same applies to columns 703 to 705.

A table 710 in FIG. 7B show capabilities of one or more printing apparatuses 103 designated by the manager, and maximum configuration profiles and minimum configuration profiles for the printing apparatuses 103. In this example, three printing apparatuses 103, namely devices A to C, are designated by the manager. The columns 711 to 714 are similar to the columns 701 to 704. A column 715 shows the maximum configuration profile for the devices A to C. The column 715 indicates that if at least one of the devices A to C has a specific capability (e.g., stapler), the logical printer has the specific capability. The column 715 indicates that if none of the devices A to C have a specific capability (e.g., bookbinding), the logical printer does not have the specific capability.

A column 716 shows the minimum configuration profile for the devices A to C. The column 716 indicates that if all of the devices A to C have a specific capability (e.g., extension cassette 1), the logical printer has the specific capability. The column 716 indicates that if at least one of the devices A to C does not have a specific capability (e.g., punch), the logical printer does not have the specific capability.

The user setting screen 600 may also include a button 613 for instructing registration of input user information. In response to the button 613 being pressed, the print server 101 registers the information designated through the user setting screen 600. For example, the user management unit 403 issues an identifier for uniquely identifying a new user, and stores the input information in the user information 413 in association with this identifier (hereinafter, user ID). When "maximum setting option configuration profile" is designated on the pulldown list 611, the profile management unit 405 generates a maximum configuration profile for one or more printing apparatuses 103 designated by the manager. When "minimum setting option configuration profile" is designated on the pulldown list 611, the profile management unit 405 similarly generates a minimum configuration profile. The profile management unit 405 stores the generated configuration profile in the profile information 415 in association with the newly registered user (specifically, its user ID). The content of the maximum configuration profile and minimum configuration profile may differ depending on which one or more printing apparatuses 103 are designated by the manager. The user setting screen 600 may also include a button 612 for canceling the setting of the user information.

The print server 101 may store the configuration profile in association with also the location at which the information processing apparatus 102 is used. For example, the print server 101 may associate the configuration profile with the location designated on the pulldown list 605.

In step S502, the print server 101 (e.g., user management unit 403) notifies the manager of the user ID for the new user. The manager provides this user ID to the user. The user ID may also be used for identifying the user when the user uses the CPS.

In step S503, the print server 101 determines whether the manager has made an instruction to generate a new configuration profile. Upon determining that the manager has made an instruction to generate a new configuration profile ("YES" in step S503), the print server 101 causes the processing to transition to step S504, and in other cases ("NO" in step S503), the print server 101 causes the processing to transition to step S505. When "create configuration profile" is designated on the pulldown list 611, the print server 101 determines that the manager has made an instruction to generate a new configuration profile, for example.

In step S504, the print server 101 (e.g., UI control unit 409) creates a screen for creating a configuration profile (hereinafter referred to as a profile creation screen), and presents the profile creation screen to the manager. An example of the profile creation screen 800 will be described with reference to FIG. 8. The manager of the print server 101 can create a configuration profile to be associated with the user through the profile creation screen 800.

Figure 8:
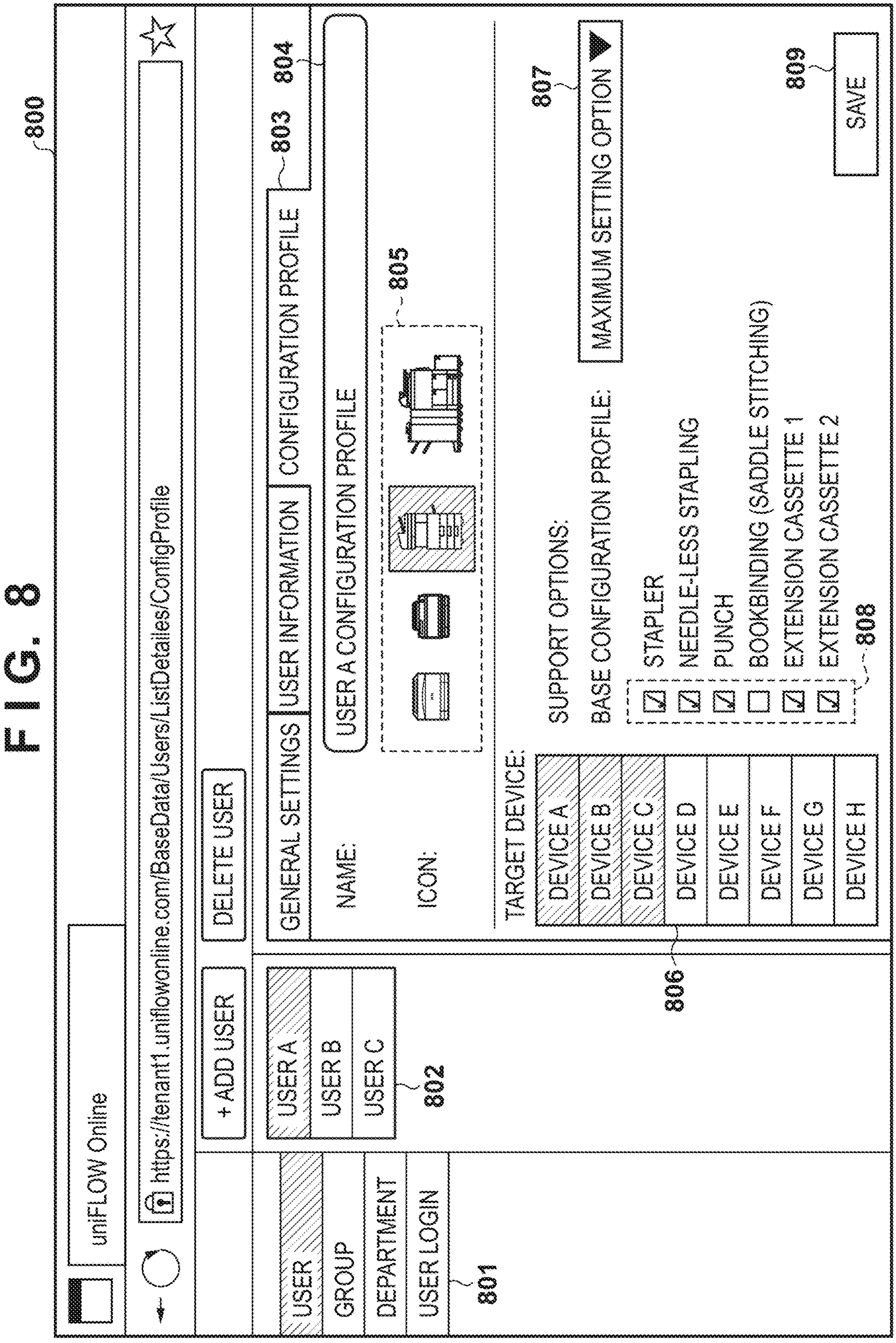
FIG. 8 is a schematic diagram for describing an example of a profile creation screen of some embodiments.

The profile creation screen 800 may include a menu 801 for designating setting content. When setting related to a user is performed, "user" is designated on the menu 801. The profile creation screen 800 may also include a list 802 for designating a user. The list 802 shows users registered in the print server 101. The print server 101 obtains designation of a configuration profile from the manager in association with a specific user designated on the list 802. The profile creation screen 800 may also include a tab 803 for designating creation of a configuration profile. By selecting the tab 803, a screen such as is shown in FIG. 8 is displayed.

The profile creation screen 800 may also include a field 804 for inputting a name of the configuration profile to be newly created. The profile creation screen 800 may also include a list 805 for designating an icon representing a logical printer to which the configuration profile to be newly created is applied. The profile creation screen 800 may also include a list 806 for designating one or more printing apparatuses 103 that are to be available to the user. The profile creation screen 800 may also include a pulldown list 807 for designating a configuration profile that is to be a base. The pulldown list 807 may include "maximum setting option" and "minimum setting option". The maximum setting option may indicate capabilities that at least one of the one or more printing apparatuses 103 that are designated by the manager as being available to the user has. The minimum setting option may indicate capabilities that all of the one or more printing apparatuses 103 that are designated by the manager as being available to the user have.

The profile creation screen 800 may also include a checkbox 808 for designating whether each of the plurality of capabilities is to be included in a configuration profile for the logical printer. The print server 101 may set the initial state of the checkbox 808 so as to match the configuration profile selected from the pulldown list 807. Also, the state of the checkbox 808 may be able to be individually changed by the manager.

The profile creation screen 800 may also include a button 809 for instructing to generate the designated configuration profile. In response to the button 809 being pressed, the print server 101 (e.g., profile management unit 405) generates a configuration profile having capabilities designated by the checkbox 808, and stores the configuration profile in the profile information 415 in association with the user selected on the list 802. The configuration profile generated as described above indicates capabilities designated by the manager.

The profile creation screen 800 may also be used for creating a configuration profile to be associated with a user group. For example, when “group” is designated on the menu 801, user groups registered in the print server 101 are displayed on the list 802. The print server 101 obtains designation of a configuration profile from the manager in association with the specific user group designated on the list 802. Thereafter, the manager can designate capabilities of the configuration profile regarding the user group, similarly to the designation of capabilities of a configuration profile regarding a user as described above. In response to the button 809 being pressed, the print server 101 (e.g., profile management unit 405) generates a configuration profile having capabilities designated by the checkbox 808, and stores the configuration profile in the profile information 415 in association with the user group selected on the list 802.

In step S505, the print server 101 determines whether the manager has made an instruction to generate an installation package. Upon determining that the manager has made an instruction to generate an installation package (“YES” in step S505), the print server 101 causes the processing to transition to step S506, and in other cases (“NO” in step S505), the print server 101 ends the processing.

In step S506, the print server 101 (e.g., UI control unit 409) generates a screen for creating an installation package (hereinafter referred to as a package creation screen), and presents the package creation screen to the manager. An example of the package creation screen 900 will be described with reference to FIG. 9. The manager of the print server 101 can create an installation package to be associated with the user through the package creation screen 900.

The package creation screen 900 may include a radio button 901 for designating a timing at which a client application for using the CPS is to be started. The package creation screen 900 may also include a checkbox 902 for designating whether a logical printer is to be created when a client application is installed. The package creation screen 900 may also include a button 903 for changing the name of a logical printer to be installed.

The package creation screen 900 may also include a pulldown list 904 for designating a configuration profile to be included in the installation package. The pulldown list 904 may include options shown in FIG. 9. The pulldown list 904 may present a plurality of candidates of the configuration profile. When a configuration profile associated with a specific user is stored in the profile information 415 at the time of creating an installation package for the specific user, the pulldown list 904 may include this configuration profile associated with the specific user. For example, when an installation package for a user A is created, the pulldown list 904 may include a “configuration profile of the user A”. When a specific user belongs to a specific user group, and a configuration profile associated with this user group is stored in the profile information 415, the pulldown list 904 may also include this configuration profile associated with the specific user group. For example, when an installation package for a user A belonging to a group A is created, the pulldown list 904 may include a “configuration profile of the group A”.

The pulldown list 904 may include the aforementioned “maximum setting option configuration profile” and “minimum setting option configuration profile”. These two configuration profiles may change according to the printing apparatus 103 available for the user.

The pulldown list 904 may include “creates configuration profile”. When this option is designated, the print server 101 (e.g., UI control unit 409) creates a screen for creating a configuration profile (hereinafter referred to as a profile creation screen), and presents the profile creation screen to the manager. An example of a profile creation screen 1000 will be described with reference to FIG. 10. The manager of the print server 101 can create a configuration profile to be included in an installation package through the profile creation screen 1000.

The profile creation screen 1000 may include a field 1001 for inputting a name of the configuration profile to be included in an installation package. The profile creation screen 1000 may also include a list 1002 for designating an icon representing a logical printer to which the configuration profile to be included in the installation package is applied. The profile creation screen 1000 may also include a checkbox 1003 for designation whether each of a plurality of capabilities is to be included in the configuration profile for the logical printer. The state of the checkbox 1003 may be able to be individually changed by the manager. In response to a button 1004 being pressed, the print server 101 (e.g., profile management unit 405) creates a configuration profile including the capabilities designated by the checkbox 1003, and stores the configuration profile in the profile information 415 as a configuration profile to be included in the installation package. The profile creation screen 1000 may also include a button 1005 for canceling creation of the configuration profile.

Figure 9:
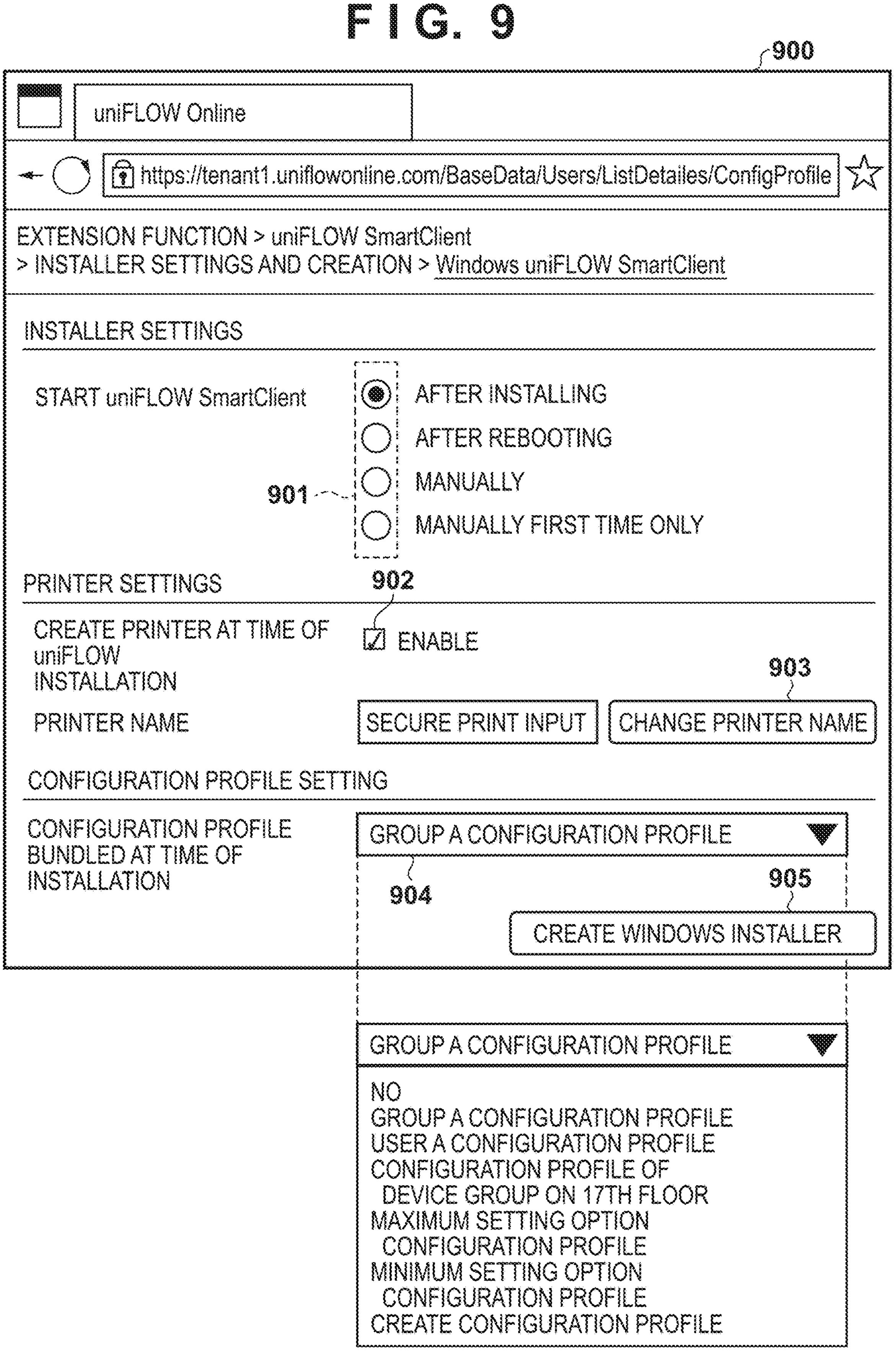
FIG. 9 is a schematic diagram for describing an example of a package creation screen of some embodiments.
Figure 10:
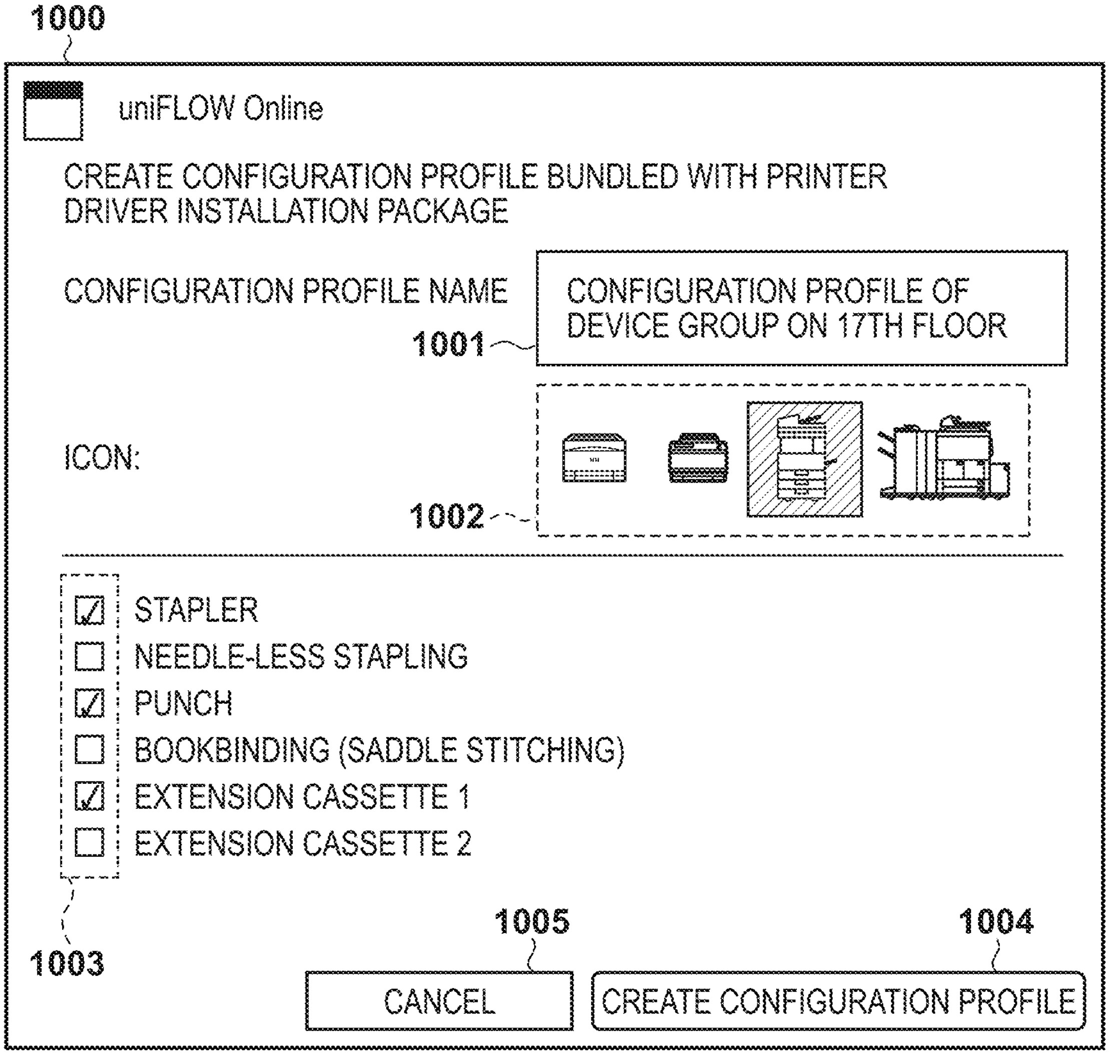
FIG. 10 is a schematic diagram for describing an example of a profile creation screen of some embodiments.

Returning to the description of FIG. 9, in response to the button 1004 being pressed, the print server 101 (e.g., printer driver management unit 406) creates an installation package including the printer driver 416, based on the content designated through the package creation screen 900. When a specific configuration profile is designated on the pulldown list 904, the print server 101 (e.g., printer driver management unit 406) includes the designated configuration profile in the installation package. Thereafter, the print server 101 (e.g., printer driver management unit 406) stores the created installation package in the storage of the print server 101 in association with the user.

In the example described above, the pulldown list 611 includes both of “maximum setting option configuration profile” and “minimum setting option configuration profile”. Instead thereof, the pulldown list 611 may include only one of “maximum setting option configuration profile” and “minimum setting option configuration profile”. The same applies to the pulldown list 904.

In the example described above, when “create configuration profile” is designated on the pulldown list 611 of the user setting screen 600, in the user registration processing, the profile creation screen 800 is presented to the manager. Instead of this or in addition to this, the profile creation screen 800 may also be used to add or change a configuration profile to be associated with an existing user or an existing user group. Also, the profile creation screen 800 may also be used by a user of the print server 101 to change the registration content of the user. For example, a user may login the print server 101 by inputting a user ID issued by the print server 101, and change the configuration profile associated with the user. Similarly, the package creation screen 900 may also be used by a user of the print server 101 to change the installation package to be provided to the user.

The print server 101 may further obtain designation of the location to be associated with a configuration profile through the profile creation screen 800. The print server 101 may store the configuration profile further in association with the location at which the information processing apparatus 102 is used. The print server 101 (e.g., profile management unit 405) may associate and store a plurality of locations with respective configuration profiles.

[Exemplary Operation of CPS Provision Processing]

An example of the operation for providing the CPS by the print server 101 will be described with reference to FIG. 11. The method in FIG. 11 may be started in response to receiving an instruction to start providing the CPS from the manager of the print server 101.

In step S1101, the print server 101 (e.g., printer driver management unit 406) determines whether a request for an installation package has been received from the information processing apparatus 102. Upon determining that this request has been received ("YES" in step S1101), the print server 101 causes the processing to transition to step S1102, and in other cases ("NO" in step S1101), the print server 101 repeats step S1101.

In step S1102, the print server 101 (e.g., printer driver management unit 406) determines whether the request received in step S1101 designates a specific user. Upon determining that this request designates a specific user ("YES" in step S1102), the print server 101 causes the processing to transition to step S1103, and in other cases ("NO" in step S1102), the print server 101 causes the processing to transition to step S1105. For example, if the request includes an identifier (user ID) of a user, the print server 101 may determine that the request designates a specific user. Instead of this or in addition to this, if a user has made a request to the print server 101 for the installation package in a state in which the user has logged in the print server 101 using an own identifier, the print server 101 may determine that the request designates a specific user. In the following description, the user designated by a request is referred to as a target user. The target user may or may not belong to any user group managed by the print server 101.

In step S1103, the print server 101 (e.g., printer driver management unit 406) determines whether an installation package associated with the target user or a user group to which the target user belongs is stored. Upon determining that such an installation package is stored ("YES" in step S1103), the print server 101 causes the processing to transition to step S1104, and in other cases ("NO" in step S1103), the print server 101 causes the processing to transition to step S1105.

In step S1104, the print server 101 (e.g., communication unit 407) provides (e.g., transmits) the installation package associated with the target user or the user group to which the target user belongs to the information processing apparatus 1104. When both of an installation package associated with the target user and an installation package associated with a user group to which the target user belongs are stored, the print server 101 may transmit the installation package associated with the target user.

In step S1105, the print server 101 (e.g., communication unit 407) transmits an installation package that is associated with neither the target user nor the user group to which the target user belongs to the information processing apparatus 1104. This installation package may not include a configuration profile, or may include a default configuration profile. The default configuration profile may also be a minimum profile for a plurality of printing apparatuses 103 associated with the logical printer.

In step S1106, the print server 101 (e.g., job management unit 402) determines whether a print job to the logical printer has been received from the information processing apparatus 102. Upon determining that a print job has been received ("YES" in step S1106), the print server 101 causes the processing to transition to step S1107, and in other cases ("NO" in step S1106), the print server 101 repeats step S1106.

In step S1107, the print server 101 (e.g., job management unit 402) stores the print job received in step S1106 in the storage of the print server 101. In step S1108, in response to a request from one printing apparatus 103 that is any one of the plurality of printing apparatuses 103 associated with the logical printer, the print server 101 transmits a print job stored in the storage to the one printing apparatus 103.

Figure 11:
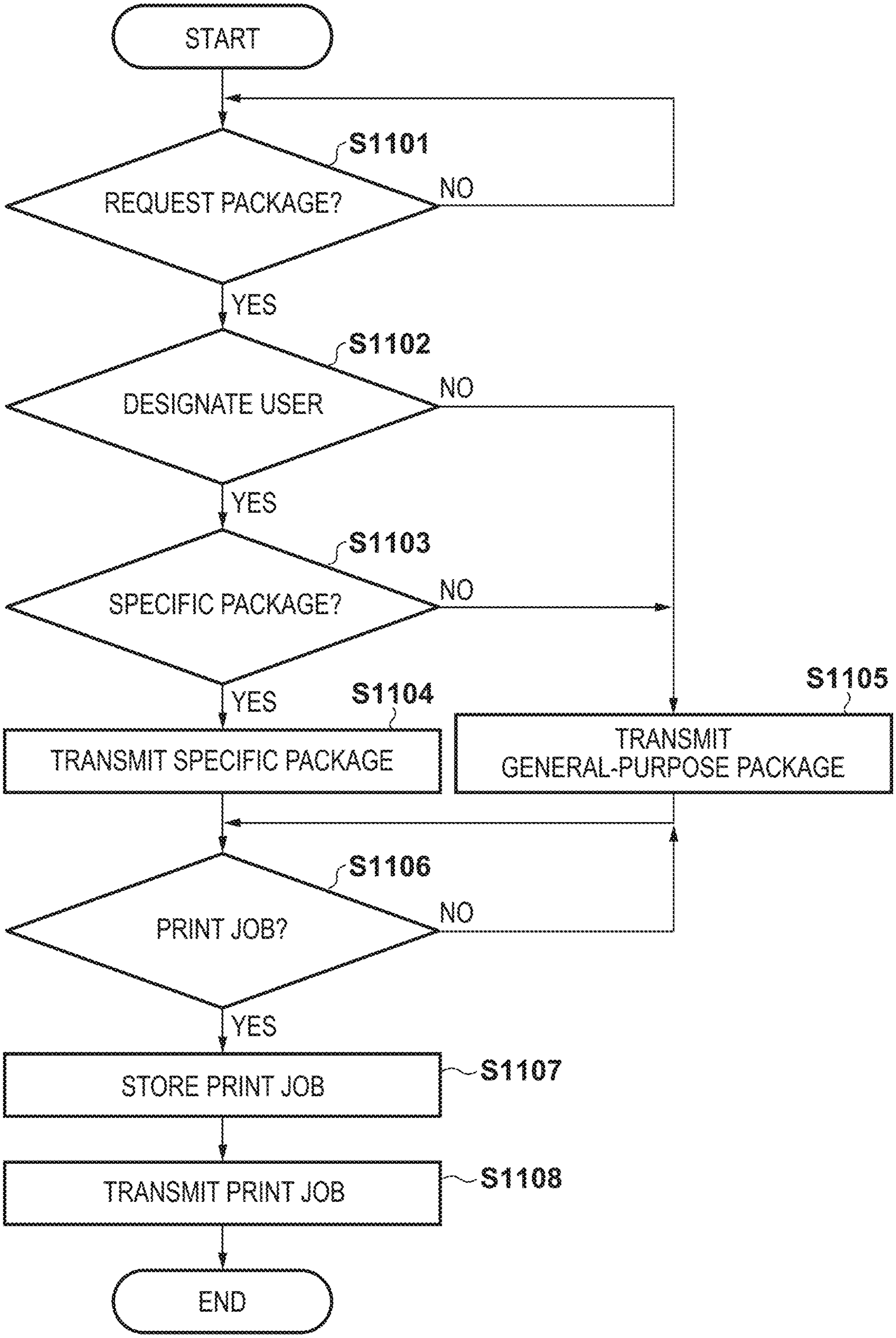
FIG. 11 is a flow diagram for describing an exemplary operation for providing a printing service of some embodiments.

With the method in FIG. 11, an installation package including a configuration profile designated by the manager of the print server 101 is provided to the information processing apparatus 102. That is, a configuration profile designated by the manager of the print server 101 is provided to the information processing apparatus 102. Accordingly, an appropriate configuration profile is provided to the user of the information processing apparatus 102.

[Exemplary Operation of Configuration Profile Provision Processing]

An example of the operation for the print server 101 to provide a configuration profile will be described with reference to FIG. 12. The method in FIG. 12 may be started in response to receiving an instruction to start providing a configuration profile from the manager of the print server 101.

In step S1201, the print server 101 (e.g., profile management unit 405) determines whether an inquiry regarding whether a configuration profile associated with a specific user is present has been received from the information processing apparatus 102. Upon determining that this inquiry has been received ("YES" in step S1201), the print server 101 causes the processing to transition to step S1202, and in other cases ("NO" in step S1201), the print server 101 repeats step S1201. The inquiry from the information processing apparatus 102 may include an identifier (user ID) of a specific user. Instead of this or in addition to this, the print server 101 may obtain an inquiry from the information processing apparatus 102 in a state in which a user has logged in the print server 101 using an own identifier. In the following description, the user designated in the inquiry is referred to as a target user.

In step S1202, the print server 101 (e.g., profile management unit 405) determines whether a configuration profile associated with the target user or a user group to which the target user belongs is stored. Upon determining that such a configuration profile is stored ("YES" in step S1202), the print server 101 causes the processing to transition to step S1203, and in other cases ("NO" in step S1202), the print server 101 causes the processing to transition to step S1204.

In step S1203, the print server 101 (e.g., communication unit 407) transmits the configuration profile associated with the target user or a user group to which the target user belongs to the information processing apparatus 1104. When both of a configuration profile associated with the target user and a configuration profile associated with a user group to which the target user belongs are stored, the print server 101 may transmit the configuration profile associated with the target user.

In step S1204, the print server 101 (e.g., communication unit 407) notifies the information processing apparatus 1104 of the fact that a configuration profile associated with the target user or a user group to which the target user belongs is not present.

In the method described above, when a configuration profile associated with the target user or a user group to which the target user belongs is stored, the print server 101 immediately transmits such a configuration profile to the information processing apparatus 102. Instead thereof, the print server 101 may notify the information processing apparatus 102 of the fact that such a configuration profile is present, and thereafter, upon receiving a request for the configuration profile from the information processing apparatus 102, the print server 101 may transmit the configuration profile to the information processing apparatus 102.

Figure 12:
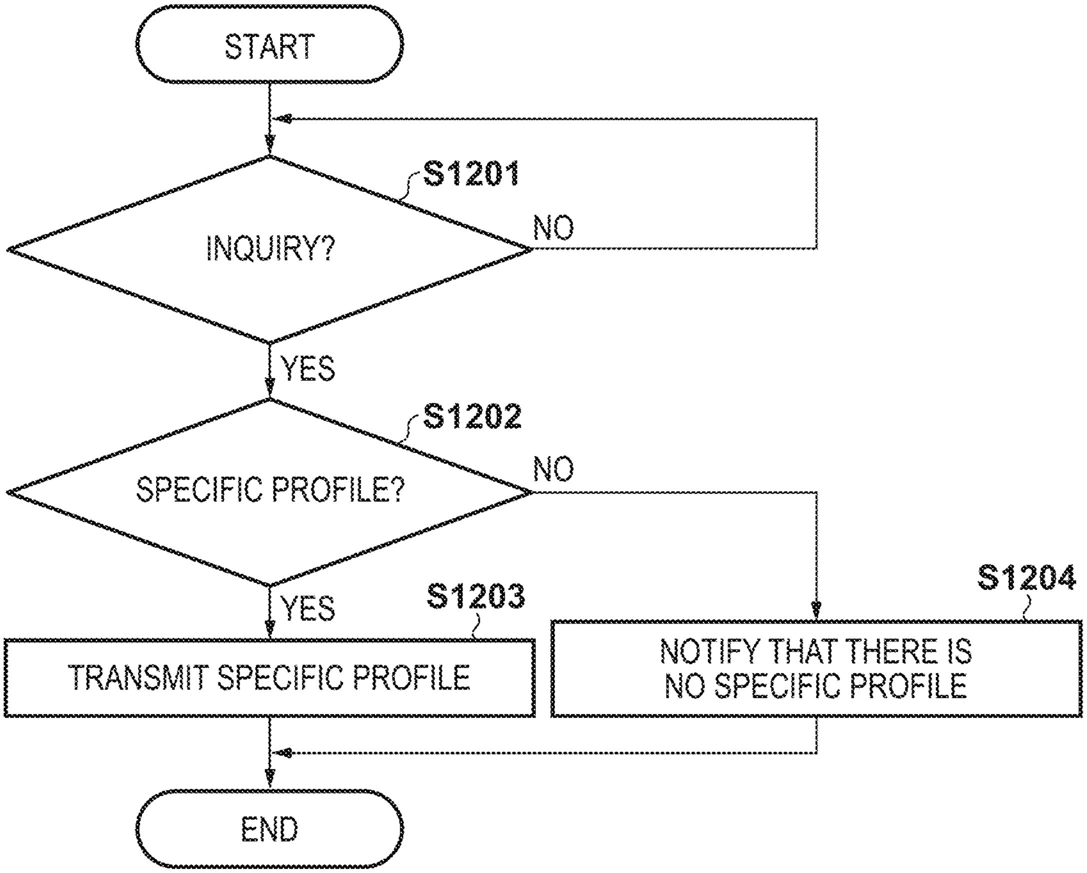
FIG. 12 is a flow diagram for describing an exemplary operation for providing a configuration profile of some embodiments.

With the method in FIG. 12, a configuration profile designated by the manager of the print server 101 is provided to the information processing apparatus 102. Accordingly, an appropriate configuration profile is provided to a user of the information processing apparatus 102.

[Exemplary Operation of Processing for Using CPS]

Figure 14:
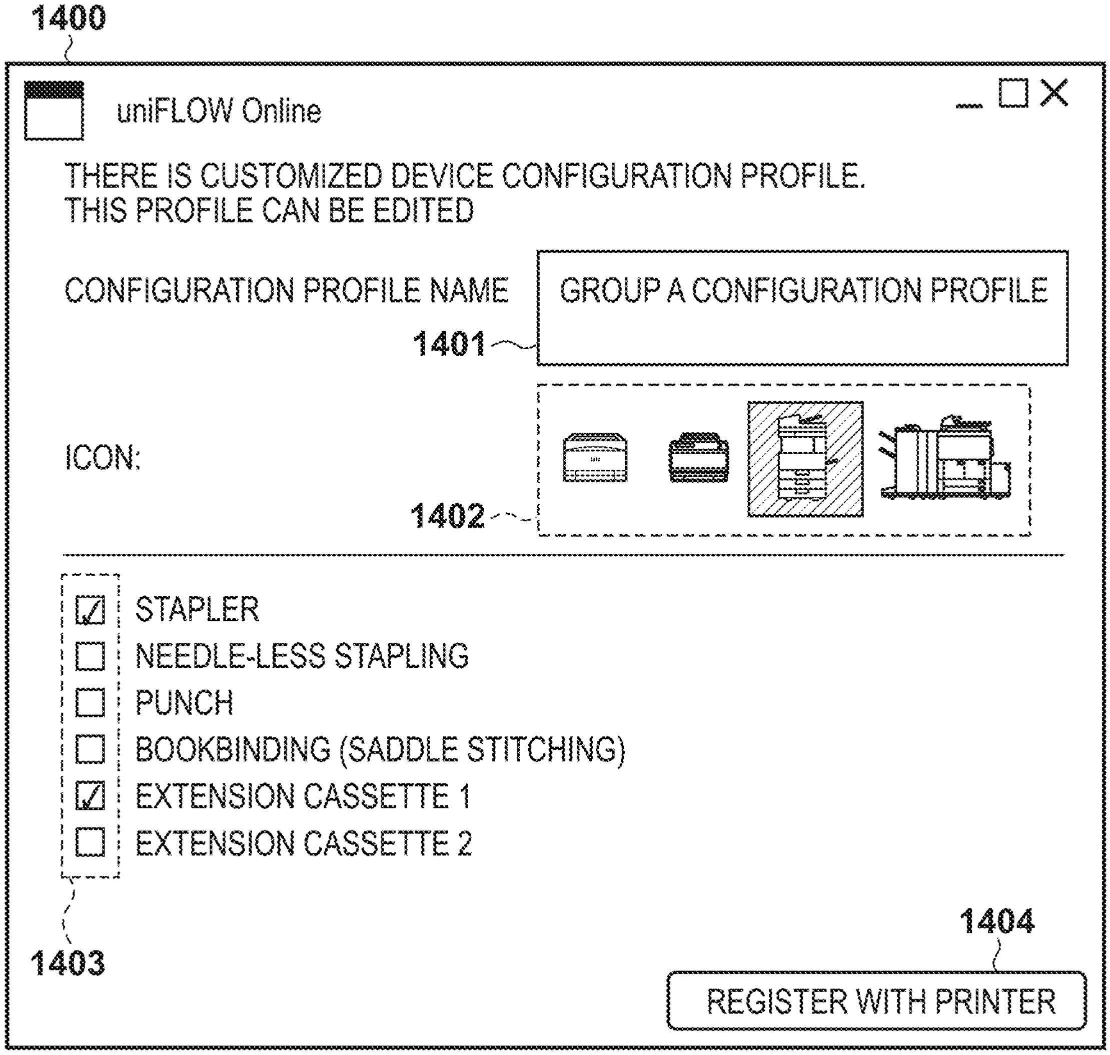
FIG. 14 is a schematic diagram for describing an example of a profile edit screen of some embodiments.
Figure 15:
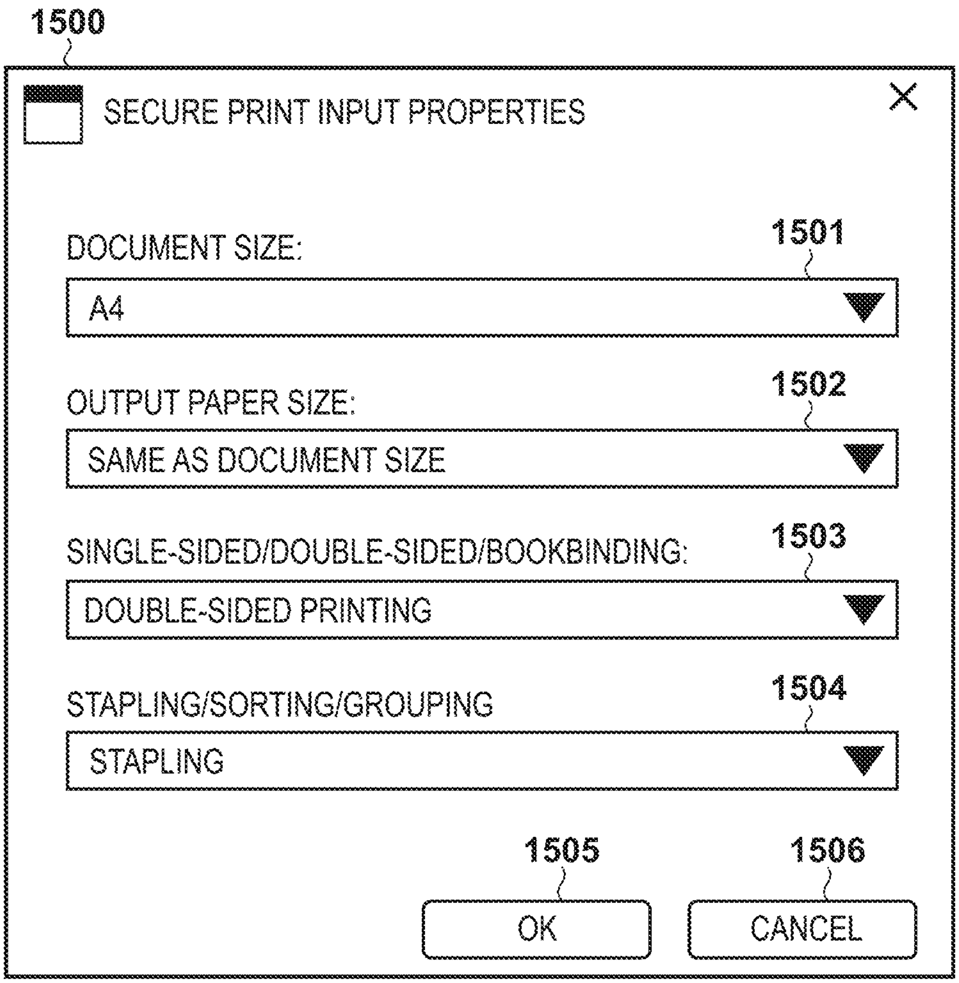
FIG. 15 is a schematic diagram for describing an example of a print setting screen of some embodiments.

An exemplary operation of the processing for the information processing apparatus 102 to use the CPS will be described with reference to FIGS. 13 to 15. The steps of the method in FIG. 13 may be performed by the CPU 201 of the information processing apparatus 102 executing a program read out in the RAM 202 of the information processing apparatus 102. Instead thereof, a portion or the entirety of the steps of the method in FIG. 13 may be performed by a dedicated circuit such as an ASIC. The same applies to other methods described below to be executed by the information processing apparatus 102. The method in FIG. 13 may be started in response to receiving an instruction to start processing for using the CPS from a user who is using the information processing apparatus 102. In the following description of FIG. 13, the user who is using the information processing apparatus 102 may be simply referred to as a user.

In step S1301, the information processing apparatus 102 transmits a request for an installation package of a printer driver corresponding to a logical printer provided by the print server 101 to the print server 101. The information processing apparatus 102 further transmits an identifier of the user to the print server 101. The identifier of the user may be included in a request for an installation package. Instead thereof, the identifier of the user may be transmitted to the print server 101 prior to or after the request for an installation package. The identifier of the user may also be a user ID notified in step S502 in FIG. 5. The print server 101 that has received this request transmits an installation package to the information processing apparatus 102 by executing the operation in FIG. 11. The information processing apparatus 102 receives this installation package from the print server 101 as a response to the request. In step S1302, the information processing apparatus 102 installs a printer driver included in the installation package by executing the installation package obtained in step S1301.

In step S1303, the information processing apparatus 102 determines whether a configuration profile associated with the user is present in the print server 101. Upon determining that a configuration profile associated with the user is present in the print server 101 ("YES" in step S1303), the information processing apparatus 102 causes the processing to transition to step S1304, and in other cases ("NO" in step S1303), the information processing apparatus 102 causes the processing to transition to step S1305. The information processing apparatus 102 may inquire of the print server 101 whether a configuration profile associated with the user is stored in the print server 101, in order to make this determination. The print server 101 that has received this inquiry replies to the inquiry by executing the operation in FIG. 12.

In step S1305, the information processing apparatus 102 determines whether the installation package obtained in step S1301 includes a configuration profile. Upon determining that the installation package includes a configuration profile ("YES" in step S1305), the information processing apparatus 102 causes the processing to transition to step S1306, and in other cases ("NO" in step S1305), the information processing apparatus 102 causes the processing to transition to step S1309.

When a configuration profile associated with the user is present in the print server 101, in step S1304, the information processing apparatus 102 obtains this configuration profile from the print server 101. When a configuration profile associated with the user is not present in the print server 101, and a configuration profile is included in the installation package, in step S1306, the information processing apparatus 102 obtains this configuration profile from the installation package. As described above with reference to FIG. 9, a configuration profile included in the installation package may also be a configuration profile associated with the user.

When a configuration profile is obtained in step S1304 or S1306, in step S1307, the information processing apparatus 102 generates a screen for editing this configuration profile (hereinafter, profile edit screen), and presents the profile edit screen to the user. An example of a profile edit screen 1400 will be described with reference to FIG. 14. A user can edit a configuration profile to be registered in a printer driver through the profile edit screen 1400.

The profile edit screen 1400 may include a field 1401 for inputting a name of the configuration profile to be registered in a printer driver. The profile edit screen 1400 may also include a list 1402 for designating an icon that represents the logical printer to which the configuration profile to be registered in the printer driver is applied. The profile edit screen 1400 may also include a checkbox 1403 for designating whether each of a plurality of capabilities is included in the configuration profile for the logical printer. The information processing apparatus 102 may set the initial state of the checkbox 1403 so as to match the configuration profile obtained in step S1304 or S1306. The state of the checkbox 1403 may be able to be individually changed by a user. That is, the information processing apparatus 102 presents the content of the configuration profile obtained in step S1304 or S1306 to a user using the checkbox 1403, and accepts a change to the content. If the state of the checkbox 1403 need not be changed, the user may keep the checkbox 1403 in the initial state (that is, the obtained configuration profile is used as is).

In step S1308, in response to the button 1404 being pressed, the information processing apparatus 102 registers a configuration profile including capabilities designated by the checkbox 1403 in the printer driver 302. The information processing apparatus 102 sets the configuration profile that has been registered to the printer driver 302 as a current configuration profile. Thereafter, the information processing apparatus 102 may notify the user of the fact that the installation of the printer driver has been completed. That is, the processing from step S1303 to step S1308 may be executed during the printer driver installation processing.

In step S1309, the information processing apparatus 102 determines whether the user has made a print instruction to the logical printer. Upon determining that the user has made a print instruction ("YES" in step S1309), the information processing apparatus 102 causes the processing to transition to step S1310, and in other cases ("NO" in step S1309), the information processing apparatus 102 repeats step S1309.

In step S1310, the information processing apparatus 102 generates a screen for performing a print setting (hereinafter, referred to as a print setting screen), and presents the print setting screen to the user. An example of a print setting screen 1500 will be described with reference to FIG. 15. The user can designate a print setting through the print setting screen 1500.

The print setting screen 1500 may include a pulldown list 1501 for designating the document size, and a pulldown list 1502 for designating the paper size. The print setting screen 1500 may also include a pulldown list 1503 for designating whether single-sided printing, double-sided printing, and bookbinding are to be performed, and a pulldown list 1504 for designating whether stapling, sorting, and grouping are to be performed. The information processing apparatus 102 generates the print setting screen 1500 based on a configuration profile registered in the printer driver 302. For example, the information processing apparatus 102 makes the capabilities shown in the configuration profile available to the user. Specifically, when the configuration profile shows that the logical printer has a double-sided printing function, the information processing apparatus 102 includes double-sided printing as an option of the pulldown list 1503. In response to the button 1505 being pressed, the information processing apparatus 102 stores the content designated on the print setting screen 1500. The print setting screen 1500 may also include a button 1506 for canceling the print setting.

In step S1311, in response to a printing start instruction from the user, the information processing apparatus 102 generates a print job having designated content. Thereafter, the information processing apparatus 102 returns the processing to step S1309, and waits for another print instruction.

The configuration profile associated with the user may be updated after the installation package has been generated. As in the processing from step S1303 to step S1308 described above, as a result of preferentially registering the configuration profile obtained from the print server 101, the latest information can be reflected on the profile edit screen 1400.

Figure 13:
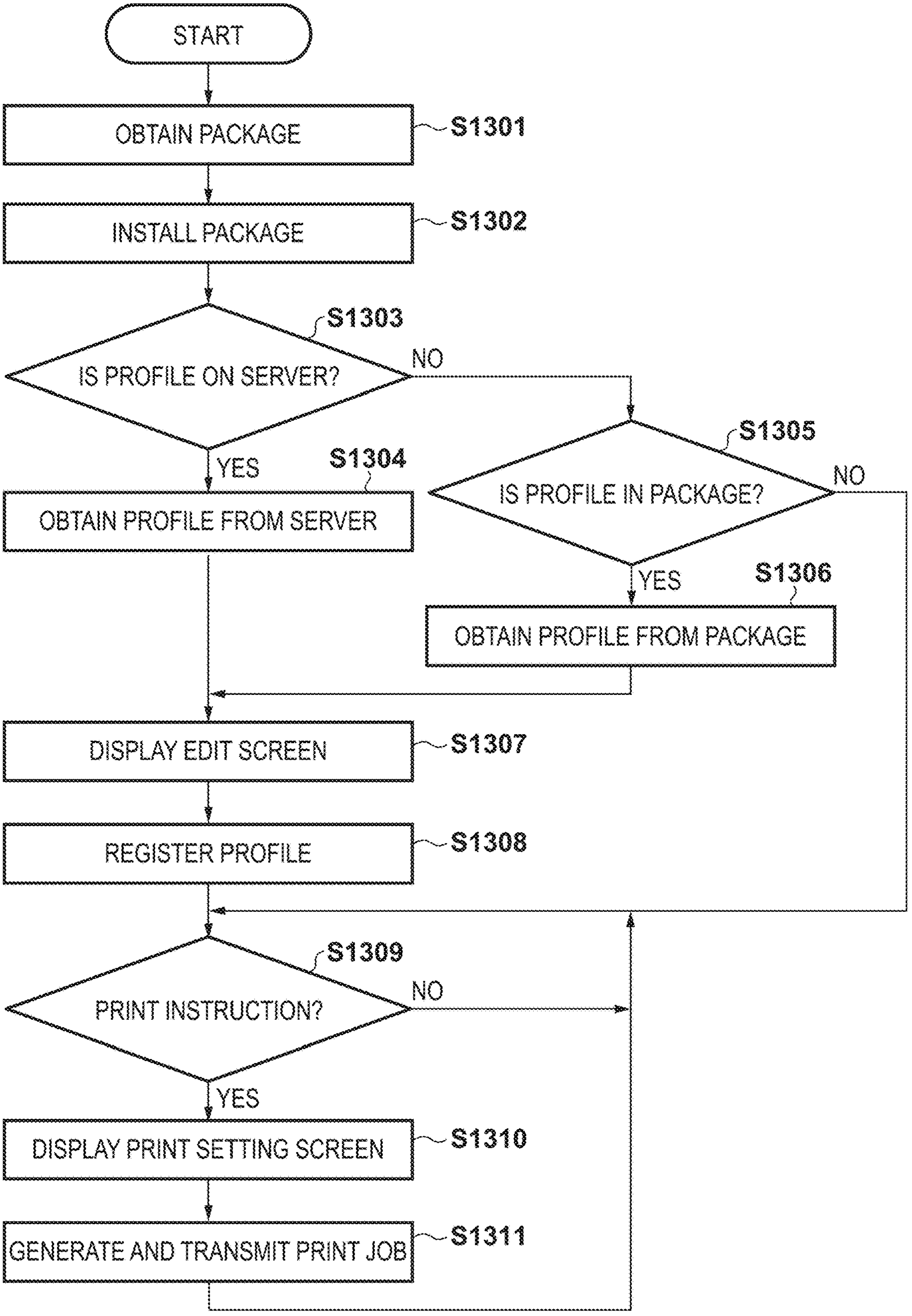
FIG. 13 is a flow diagram for describing an exemplary operation for using a printing service of some embodiments.

With the method in FIG. 13, if a configuration profile associated with the user is present when the printer driver 302 for the logical printer is installed, this configuration profile is automatically registered in the printer driver 302. Accordingly, even if the user is not conscious of it, an optimum configuration profile generated by the manager of the print server 101 becomes available for the user. Also, the user can edit the configuration profile as needed. Accordingly, an appropriate configuration profile is provided to the user.

[Exemplary Operation of Configuration Profile Update Processing]

Figure 16:
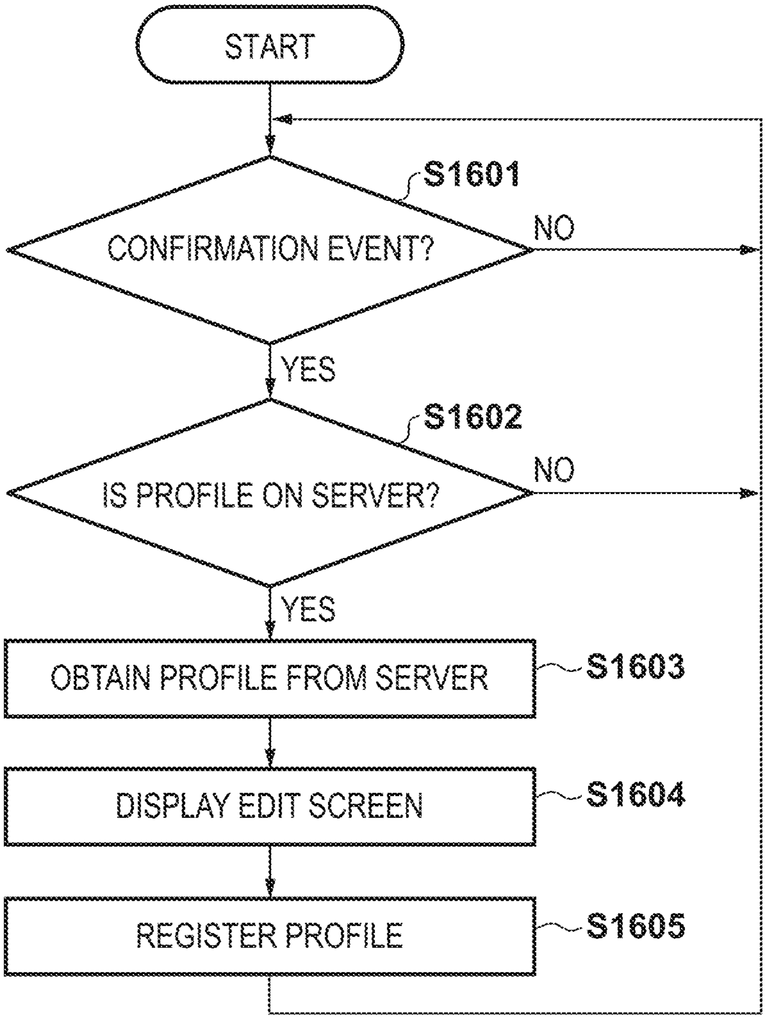
FIG. 16 is a flow diagram for describing an exemplary operation of configuration profile update processing of some embodiments.
Figure 17:
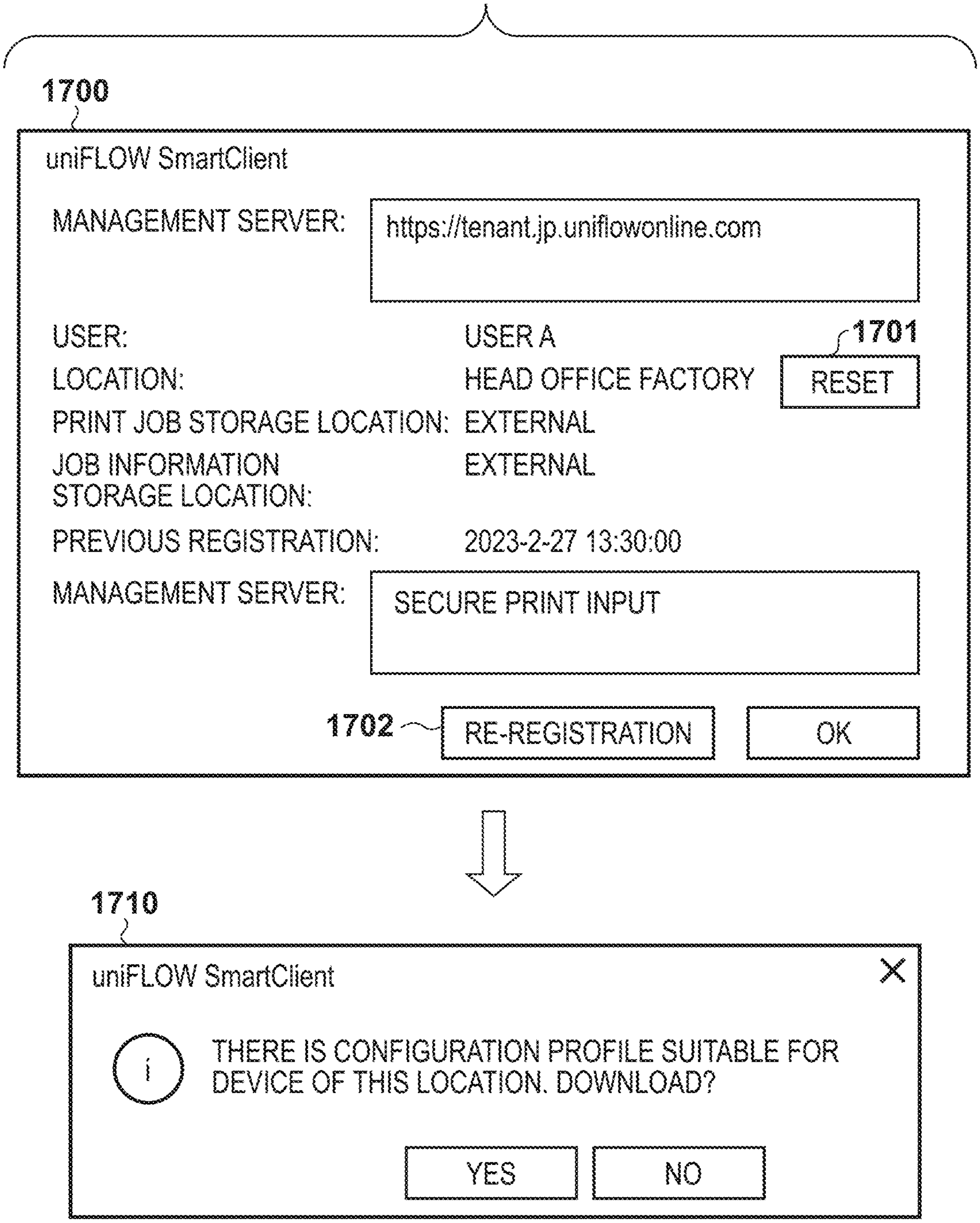
FIG. 17 is a schematic diagram for describing an example of a screen for instructing updating of a configuration profile of some embodiments.

An exemplary operation of processing for the information processing apparatus 102 to update a configuration profile will be described with reference to FIGS. 16 and 17. The method in FIG. 16 may be started after the processing for installing the printer driver 302 to the information processing apparatus 102 is ended. In the description of FIG. 16 below, the user that is using the information processing apparatus 102 is simply referred to as a user.

After the printer driver 302 is installed in the information processing apparatus 102, a new printing apparatus may be associated with the logical printer.

In this case, the optimum configuration profile for the user may change. Therefore, in the method in FIG. 16, the information processing apparatus 102 determines whether a new configuration profile can be obtained.

In step S1601, the information processing apparatus 102 determines whether a confirmation event for confirming whether a configuration profile is present in the print server 101 has occurred. Upon determining that a confirmation event has occurred ("YES" in step S1601), the information processing apparatus 102 causes the processing to transition to step S1602, and in other cases ("NO" in step S1601), the information processing apparatus 102 repeats step S1601.

The processing in step S1601 may be executed by an application resident in the information processing apparatus 102. This application may detect an occurrence of a confirmation event as a result of a button 1701 or a button 1702 in a version information display screen 1700 shown in FIG. 17 being pressed by a user. The button 1701 may be a button for re-setting the location of the information processing apparatus 102. The button 1702 may be a button for instructing to newly register a configuration profile to the printer driver.

In step S1602, similarly to step S1303, the information processing apparatus 102 determines whether a configuration profile associated with the user is present in the print server 101. Upon determining that a configuration profile associated with the user is present in the print server 101 ("YES" in step S1602), the information processing apparatus 102 causes the processing to transition to step S1603, and in other cases ("NO" in step S1602), the information processing apparatus 102 causes the processing to transition to step S1601.

In step S1603, similarly to step S1304, the information processing apparatus 102 obtains the configuration profile from the print server 101. In step S1604, similarly to step S1307, the information processing apparatus 102 generates a screen for editing this configuration profile (hereinafter, profile edit screen), and presents the profile edit screen to the user. In step S1605, similarly to step S1308, the information processing apparatus 102 registers a configuration profile including capabilities designated by the checkbox 1403 in the printer driver 302.

When the configuration profile obtained in step S1603 is the same as a configuration profile registered in the printer driver 302, the information processing apparatus 102 may omit steps S1604 and S1605. In this example, the information processing apparatus 102 determines whether these configuration profiles are the same. Instead thereof, the information processing apparatus 102 may transmit a configuration profile registered in the printer driver 302 to the print server 101. The print server 101 may determine whether this configuration profile is the same as the configuration profile stored in the print server 101.

According to the method in FIG. 16, even after the printer driver 302 has been installed, an optimum configuration profile generated by the manager of the print server 101 becomes available to the user. Accordingly, an appropriate configuration profile is provided to the user of the information processing apparatus 102.

Instead of the method in FIG. 16, the information processing apparatus 102 may make an inquiry regarding whether the configuration profile associated with the user has been updated after the information processing apparatus 102 obtained the configuration profile from the print server 101. When the configuration profile has been updated, the information processing apparatus 102 may execute steps S1603 to S1605. At this time, the information processing apparatus 102 may show the user that an updated configuration profile is present by presenting the screen 1710 in FIG. 17 to the user.

The information processing apparatus 102 may, based on the fact that the location of the information processing apparatus 102 has changed, make an inquiry, in step S1602, to the print server 101 whether a configuration profile associated with the new location is present. This inquiry may include an identifier of the changed location. If a configuration profile associated with the changed location is stored, the print server 101 may provide this configuration profile to the information processing apparatus 102. In step S1603, the information processing apparatus obtains the configuration profile associated with the new location from the print server 101.

In the embodiment described above, in both of the operation in FIG. 13 and the operation in FIG. 16, the information processing apparatus 102 obtains a configuration profile associated with a user. Instead thereof, the information processing apparatus 102 may obtain a configuration profile associated with a user by installing a general printer driver in the operation in FIG. 13, and thereafter executing the operation in FIG. 16. Instead thereof, the information processing apparatus 102 may execute the operation in FIG. 13, and may not execute the operation in FIG. 16.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-102575, filed Jun. 22, 2023, which is hereby incorporated by reference herein in its entirety.

What is claimed is:

1. A print server, comprising:

a memory having instructions stored thereon and at least one processor to execute the instructions to:

obtain, from a manager of the print server, designation of a configuration profile that indicates a capability of one logical printer associated with a plurality of printing apparatuses;

obtain, from the manager, designation of one or more printing apparatuses, among the plurality of printing apparatuses;

present a plurality of candidates of the configuration profile to the manager, wherein the plurality of candidates includes at least one of:

a maximum configuration profile that indicates capabilities held by at least one of the printing apparatuses; and a minimum configuration profile that indicates capabilities held by all of the printing apparatuses;

provide an information processing apparatus with a configuration profile designated by the manager;

receive a print job to a logical printer from the information processing apparatus; and transmit the print job to one of the plurality of printing apparatuses.

2. The print server according to claim 1, wherein the plurality of candidates includes a configuration profile indicating a capability designated by the manager.

3. The print server according to claim 1, wherein the plurality of candidates includes a configuration profile associated with a specific user or a specific user group of the print server.

4. The print server according to claim 1, wherein the instructions are further executed by the at least the processor to:

generate an installation package including a printer driver configured to generate a print job to the logical printer and a configuration profile designated by the manager, provide the installation package to the information processing apparatus.

5. The print server according to claim 1, wherein the instructions are further executed by the at least the processor to:

obtain designation of the configuration profile in association with a specific user or a specific user group of the print server; and provide, in response to a request from the specific user or a user belonging to the specific user group, the information processing apparatus with a configuration profile designated in association with the specific user or the specific user group of the print server.

6. The print server according to claim 1, wherein the designation of one or more printing apparatuses, among the plurality of printing apparatuses, is designation of one or more printing apparatuses, out of the plurality of printing apparatuses, that are to be made available to the specific user or a user belonging to the specific user group.

7. A non-transitory computer readable storage medium storing a program for causing a computer to function as a print server, comprising:

obtaining, from a manager of the print server, designation of a configuration profile that indicates capability of one logical printer associated with a plurality of printing apparatuses;

obtaining, from the manager, designation of one or more printing apparatuses, among the plurality of printing apparatuses;

presenting a plurality of candidates of the configuration profile to the manager, wherein the plurality of candidates includes at least one of:

a maximum configuration profile that indicates capabilities held by at least one of the printing apparatuses; and a minimum configuration profile that indicates capabilities held by all of the printing apparatuses;

providing an information processing apparatus with a configuration profile designated by the manager;

receiving a print job to a logical printer from the information processing apparatus; and transmitting the print job to any of the plurality of printing apparatuses.

8. A method for controlling a print server, the method comprising:

obtaining, from a manager of the print server, designation of a configuration profile that indicates capability of one logical printer associated with a plurality of printing apparatuses;

obtaining, from the manager, designation of one or more printing apparatuses, among the plurality of printing apparatuses;

presenting a plurality of candidates of the configuration profile to the manager, wherein the plurality of candidates includes at least one of:

a maximum configuration profile that indicates capabilities held by at least one of the printing apparatuses; and a minimum configuration profile that indicates capabilities held by all of the printing apparatuses;

providing an information processing apparatus with a configuration profile designated by the manager;

receiving a print job to a logical printer from the information processing apparatus; and transmitting the print job to any of the plurality of printing apparatuses.

* * * * *